United States Patent
Brockhaus et al.

(10) Patent No.: US 11,237,032 B2
(45) Date of Patent: Feb. 1, 2022

(54) MAGNETIC-INDUCTIVE FLOWMETER HAVING A CONDUCTIVITY MEASURING DEVICE AND METHOD FOR OPERATING A MAGNETIC-INDUCTIVE FLOWMETER HAVING A CONDUCTIVITY MEASURING DEVICE

(71) Applicant: KROHNE Messtechnik GmbH, Duisburg (DE)

(72) Inventors: Helmut Brockhaus, Oberhausen (DE); Markus Dabrowski, Duisburg (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 160 days.

(21) Appl. No.: 16/825,349

(22) Filed: Mar. 20, 2020

(65) Prior Publication Data
US 2020/0309579 A1 Oct. 1, 2020

(30) Foreign Application Priority Data
Mar. 27, 2019 (DE) ...................... 10 2019 107 904.7

(51) Int. Cl.
*G01F 1/58* (2006.01)
*G01F 1/60* (2006.01)

(52) U.S. Cl.
CPC ............ *G01F 1/586* (2013.01); *G01F 1/584* (2013.01); *G01F 1/588* (2013.01); *G01F 1/60* (2013.01)

(58) Field of Classification Search
None
See application file for complete search history.

(56) References Cited

U.S. PATENT DOCUMENTS

| | | | |
|---|---|---|---|
| 4,969,363 A | 11/1990 | Mochizuki | |
| 5,503,026 A | 4/1996 | Böhm et al. | |
| 8,714,027 B2 | 5/2014 | Drahm et al. | |
| 2002/0145417 A1* | 10/2002 | Brockhaus | G01F 1/60 324/204 |
| 2003/0051557 A1 | 3/2003 | Ishikawa et al. | |

(Continued)

FOREIGN PATENT DOCUMENTS

| | | | | |
|---|---|---|---|---|
| DE | 101 18 002 A1 | * | 10/2002 | ............... G01F 1/58 |
| EP | 0336615 A1 | * | 10/1989 | ............... G01F 1/58 |

*Primary Examiner* — Harshad R Patel
(74) *Attorney, Agent, or Firm* — David S. Safran; Roberts Calderon Safran & Cole, P.C.

(57) ABSTRACT

A magnetic-inductive flowmeter having a measuring tube for guiding a conductive medium, having a magnetic field generator for generating a magnetic field passing through the measuring tube at least partially perpendicular to the medium flow direction, electrodes for tapping a measuring voltage induced in the medium and a conductivity measuring device for determining the conductivity of the medium. The conductivity measuring device has a measuring circuit with the electrodes, a voltage source and a measuring unit. In operation, the voltage source generates a voltage and the measuring unit measures the actual electrode voltage applied between the electrodes. The control unit sets the actual electrode voltage to a predetermined constant setpoint value and the evaluation unit determines the electrode current flowing between the electrodes and calculates the conductivity value of the medium or a variable related to the conductivity using the determined electrode current and the actual electrode voltage.

12 Claims, 3 Drawing Sheets

(56) References Cited

U.S. PATENT DOCUMENTS

| | | | |
|---|---|---|---|
| 2005/0115334 A1* | 6/2005 | Brockhaus | B30B 9/326 73/861.11 |
| 2005/0125168 A1* | 6/2005 | Brockhaus | G01F 1/60 702/45 |
| 2006/0116854 A1* | 6/2006 | Brockhaus | G01F 1/58 702/183 |
| 2008/0016967 A1 | 1/2008 | Schrag et al. | |
| 2012/0036941 A1 | 2/2012 | Drahm et al. | |
| 2015/0000421 A1 | 1/2015 | Brockhaus et al. | |
| 2015/0204703 A1* | 7/2015 | Brockhaus | G01F 1/58 73/861.12 |

* cited by examiner

MAGNETIC-INDUCTIVE FLOWMETER HAVING A CONDUCTIVITY MEASURING DEVICE AND METHOD FOR OPERATING A MAGNETIC-INDUCTIVE FLOWMETER HAVING A CONDUCTIVITY MEASURING DEVICE

BACKGROUND OF THE INVENTION

Field of the Invention

The invention relates to a magnetic-inductive flowmeter, having a measuring tube for guiding an electrically conductive medium, having a magnetic field generator for generating a magnetic field passing through the measuring tube at least partially perpendicular to the flow direction of the medium, having electrodes for tapping a measuring voltage induced in the medium and having a conductivity measuring device for determining the conductivity of the conductive medium. In addition, the invention relates to a method for operating such a magnetic-inductive flowmeter.

Description of the Related Art

Magnetic-inductive flowmeters are used to determine the flow of an electrically conductive medium. When, in the following, the "conductivity" of the medium is referred to in a simplified manner, the electrical conductivity of the medium is always meant. The measuring principle underlying flow measurement is based on the principle of charge separation of particles in a magnetic field. The charge separation leads to an induced voltage—the measuring voltage—which is proportional to the flow velocity of the charge carriers moving in the medium, so that the flow rate in the medium can be deduced from the flow velocity. It is known from practice to use a magnetic field that alternates over time for magnetic-inductive flow measurement.

In order for a magnetic-inductive flow measurement to be performed on a medium, the medium must have a minimum electrical conductivity. However, the conductivity or the conductivity value of the electrically conductive medium is often not known. Correspondingly, magnetic-inductive flowmeters are known from the prior art, which also have a conductivity measuring device with which the conductivity of the conductive medium can be determined.

To determine the conductivity, a current is impressed between the electrodes and then the resulting voltage applied between the two electrodes is measured. A resistance value can be calculated from the ratio of the measured voltage to the impressed current which serves as a basis for determining the conductivity of the medium flowing in the measuring tube, wherein the conductivity of the medium is proportional to the reciprocal of the determined resistance value.

In addition, it is known to perform the conductivity measurement in the switching phases of the magnetic field generated for the magnetic-inductive flow measurement, in order to use the time necessary for the magnetic field to stabilize sufficiently. Accordingly, during the switchover time of the magnetic field, the current between the electrodes necessary for the conductivity measurement is impressed into the medium and the voltage drop by the current across the medium is measured at the electrodes.

Before the actual magnetic-inductive flow measurement is started, the impressed current is switched off. Although the conductivity measurement is completed, a residual voltage dependent on the conductivity of the medium remains between the electrodes. This residual voltage is also measured during flow measurement and leads to an error that is dependent on the conductivity of the medium. This error is noticeable by a voltage offset and makes the flow value determined by the magnetic-inductive flow measurement dependent on the conductivity of the medium.

SUMMARY OF THE INVENTION

Accordingly, the object of the present invention is to provide a magnetic-inductive flowmeter with which improved flow measurement can be carried out. Furthermore, the object of the invention is to provide a method for operating such a magnetic-inductive flowmeter.

The object is achieved in the magnetic-inductive flowmeter according to the invention, with the features that the conductivity measuring device has a measuring circuit, wherein the electrodes are part of the measuring circuit and the measuring circuit has a voltage source and a measuring unit. In the operating state of the conductivity measuring device, the voltage source generates a measuring circuit voltage in the measuring circuit. The measuring unit measures the actual electrode voltage applied between the electrodes. In addition, the conductivity measuring device of the magnetic-inductive flowmeter according to the invention has a control unit and an evaluation unit. In the operating state of the conductivity measuring device, the control unit sets the actual electrode voltage to a predetermined constant setpoint value. The evaluation unit determines the electrode current flowing between the electrodes and uses the value for the determined electrode current and the actual electrode voltage to calculate the conductivity value of the medium and/or a variable related to the conductivity. Such a quantity can be, for example, the resistance value of the medium. As an explanation, it is noted that, with the measured actual electrode voltage and the determined electrode current, the conductivity or resistance value of the medium can first be calculated in the specific geometric arrangement of electrodes and measuring tube. However, a factor can then be used to infer the conductivity or electrical resistance of the medium as a material variable.

In contrast to what is known from the prior art, in the magnetic-inductive flowmeter according to the invention, for determining the conductivity of the medium, a current is not impressed between the electrodes and the resulting voltage measured, but instead a constant electrode voltage is generated between the electrodes and the electrode current resulting from the constant voltage is determined. The conductivity value of the conductive medium is then determined from the two values. The magnetic-inductive flowmeter according to the invention has the advantage over the prior art that the electrode voltage applied between the electrodes when measuring the conductivity of the medium is essentially constant, and thus, no longer dependent or determined by the conductivity of the medium. Accordingly, the residual voltage remaining at the electrodes after completion of the conductivity measurement is also constant, which leads to a constant offset in the magnetic-inductive flow measurement that is independent of conductivity and can therefore be taken into account or, respectively, be compensated for much more easily by calculation.

The voltage generated by the voltage source in the measuring circuit can have an arbitrary form. In a particularly preferred configuration, however, the voltage is an AC voltage, preferably a harmonic AC voltage. In a preferred configuration, two sinusoidal voltages are superimposed on the generated voltage. It is particularly preferred that the frequency of the second sinusoidal voltage is twice as high as the frequency of the first sinusoidal voltage.

In a first configuration of the magnetic-inductive flowmeter, the control unit and the evaluation unit are designed as separate units. In a second configuration of the magnetic-inductive flowmeter according to the invention, however, the control unit and the evaluation unit are implemented as a common unit, in particular implemented by a microcontroller.

According to the invention, the electrode current flowing between the electrodes through the medium and thus in the measuring circuit is measured. In a first configuration, the measuring circuit of the conductivity measuring device has a current measuring unit which measures the electrode current—and thus the measuring circuit current. It is particularly preferred that the current measuring unit transmits the value for the measured electrode current to the evaluation unit. In a second configuration of the magnetic-inductive flowmeter according to the invention, the evaluation unit determines the voltage difference between the generated measuring circuit voltage and the actual electrode voltage and determines the electrode current from the voltage difference and a resistance value of the measuring circuit. This design has the advantage that no additional measuring unit, namely no additional current measuring unit, has to be provided. Instead, the electrode current flowing between the electrodes can be determined with the help of known variables.

The resistance value of the measuring circuit is stored in the evaluation unit in a particularly preferred configuration of the magnetic-inductive flowmeter according to the invention. It is particularly preferred that an electrical resistance is integrated into the measuring circuit, wherein the electrical resistance has a known resistance value which is stored in the evaluation unit.

A particularly preferred configuration of the magnetic-inductive flowmeter is wherein the specified constant setpoint value for the electrode voltage is stored in the control unit. The control unit compares the actual electrode voltage measured by the measuring unit with the stored setpoint value and thus determines a control difference. The control difference is therefore the difference value between the setpoint and the actual electrode voltage. Using the control difference, the control unit readjusts the measuring circuit voltage. In a particularly preferred configuration, the control unit is designed as a P-controller (proportional controller), PI-controller (proportional-integral controller) or PID-controller (proportional-integral-derivative controller).

In a particularly preferred configuration, the setpoint for the electrode voltage is 1 mV, so that the actual electrode voltage is set to 1 mV. However, smaller or larger values for the setpoint are also conceivable.

A further design of the magnetic-inductive flowmeter is wherein the measuring circuit has at least two alternative measuring paths which can be integrated into the measuring circuit by at least one switch each. Each of the at least two measuring paths has a resistance, wherein the at least two resistors of the at least two measuring paths have different resistance values from one another. The resistance values of the different resistors are stored in the control unit. In addition, the control unit is designed such that it can switch the switches and thus connect the alternative measuring paths into the measuring circuit in an alternatively effective manner. In a preferred design, the measuring circuit has three measuring paths which can be integrated into the measuring circuit at least by a respective switch.

In a particularly preferred configuration, the control unit is designed such that it makes the decision as to which measuring path is to be effectively connected into the measuring circuit dependent on the control difference, i.e., the difference between the setpoint value and the measured actual electrode voltage, and the feature that the voltage source is operated at the limit of its control range. Switching from one measuring path to another measuring path is therefore preferred whenever the voltage source is operated at the limits of its control range, but the control difference still exists or exceeds a tolerable value. The great advantage of the magnetic-inductive flowmeter is that a very wide measuring range can be implemented. The measuring range of the conductivity measuring device can be set and varied accordingly by connecting an alternative measuring path.

In a further design of the magnetic-inductive flowmeter according to the invention, a capacitor is provided in the measuring circuit. In the design in which the measuring circuit has several alternatively switchable measuring paths, a capacitor is provided in each measuring path. The capacitor serves to filter—in the sense of suppression—direct current components in the measuring circuit. Such direct current components would have an unfavorable effect on the electrode voltage and therefore also influence the flow measurement, which is prevented by filtering with the capacitor. The capacitance of the capacitor is selected so large that the voltage drop across the capacitor can be practically neglected, for example, compared to the voltage drop across the medium path (measurable at the electrodes), and for example, compared to the voltage drop across the additional ohmic resistance.

In addition to the magnetic-inductive flowmeter, the invention also relates to a method for operating a magnetic-inductive flowmeter according to the invention, namely a method for operating a magnetic-inductive flowmeter comprising a measuring tube for guiding a conductive medium, a magnetic field generator for generating a magnetic field passing through the measuring tube at least partially perpendicular to the flow direction of the medium, electrodes for tapping a measuring voltage induced in the medium and a conductivity measuring device with a measuring circuit, wherein the electrodes are part of the measuring circuit and wherein the measuring circuit comprises a voltage source and a measuring unit, and wherein the conductivity measuring device comprises a control unit and an evaluation unit.

In the method according to the invention, a measuring circuit voltage is generated in the measuring circuit by the voltage source in a generating step and the actual electrode voltage between the electrodes is measured by the measuring unit in a measuring step. In a comparison step, the control unit compares the measured actual electrode voltage with a predetermined setpoint value and determines a control difference.

If the control difference exceeds a predetermined value, the measuring circuit voltage is readjusted by the control unit in an adjustment step until the control difference is below the predetermined value or corresponds to the predetermined value. The predetermined value is stored in the control unit, for example.

In a determining step, the evaluation unit determines the electrode current flowing between the electrodes and in a calculation step the evaluation unit calculates a value for the conductivity from the electrode current and the actual electrode voltage and/or a variable related to the conductivity. The variable related to the conductivity can be, for example, the resistance value of the medium.

In a particularly preferred version of the method according to the invention, the electrode current is determined in the determination step from the difference between the applied measuring circuit voltage and the actual electrode voltage and a resistance value of the measuring circuit. It is particularly preferred that the resistance value of the measuring circuit is stored in the evaluation unit.

The method according to the invention can be carried out in various manners. In one version, the determination step and the calculation step are carried out if the control difference corresponds to the predetermined value or is below the predetermined value. In this case, the predetermined value corresponds to a tolerable deviation of the actual electrode voltage from the setpoint value and can be specified by a user, for example. If the control difference corresponds to the predetermined value or is even smaller than the predetermined value, the actual electrode voltage is adjusted accordingly.

In a further version, the determination step and the calculation step are carried out independently of the value of the determined control difference, i.e., independently of whether the actual electrode voltage already corresponds to the setpoint value. At the same time, the adjusting step is carried out until the actual electrode voltage corresponds to the setpoint value. In this version, the individual steps are repeated several times, preferably until the control difference finally corresponds to the predetermined value.

If the measuring circuit of the magnetic-inductive flowmeter has at least two alternative measuring paths, each of which can be integrated into the measuring circuit by means of a switch, and if each of the at least two measuring paths also has a resistor, wherein the at least two resistors of the at least two measuring paths have a different resistance value from one another and wherein the at least two resistance values of the resistors are stored in the control unit, a further development of the method according to the invention is characterized in that, in a switching step, one of the switches is closed by the control unit, whereby one of the measuring paths is effectively connected into the measuring circuit. The control unit preferably switches exactly one of the measuring paths effectively into the measuring circuit. This design allows the measuring range of the conductivity measuring unit to be varied in a simple manner.

It is particularly preferred that, in a control step, the control unit checks whether the voltage source is operated at the limit of its control range. In addition, the control unit checks in the control step whether the control difference is above the predetermined value. In a decision step following the control step, the control unit decides whether another alternative measuring path is effectively connected to the measuring circuit. The decision to switch another measuring path into the measuring circuit is then positively decided if the voltage source is operated at the limit of its control range, whereby this can be both the upper limit and the lower limit, and if at the same time the control difference is above the predetermined value, i.e., if the actual electrode voltage does not yet correspond to the target value. Preferably, the control unit selects the measuring path which has the next higher or next lower resistance value, depending on whether the voltage source is operated at its upper limit or at its lower limit.

In detail, there are a plurality of possibilities for designing and further developing the magnetic-inductive flowmeter and the method according to the invention as will become apparent from the following description of particularly the preferred embodiments with reference to the accompanying drawings.

DETAILED DESCRIPTION OF THE INVENTION

Figure 1:
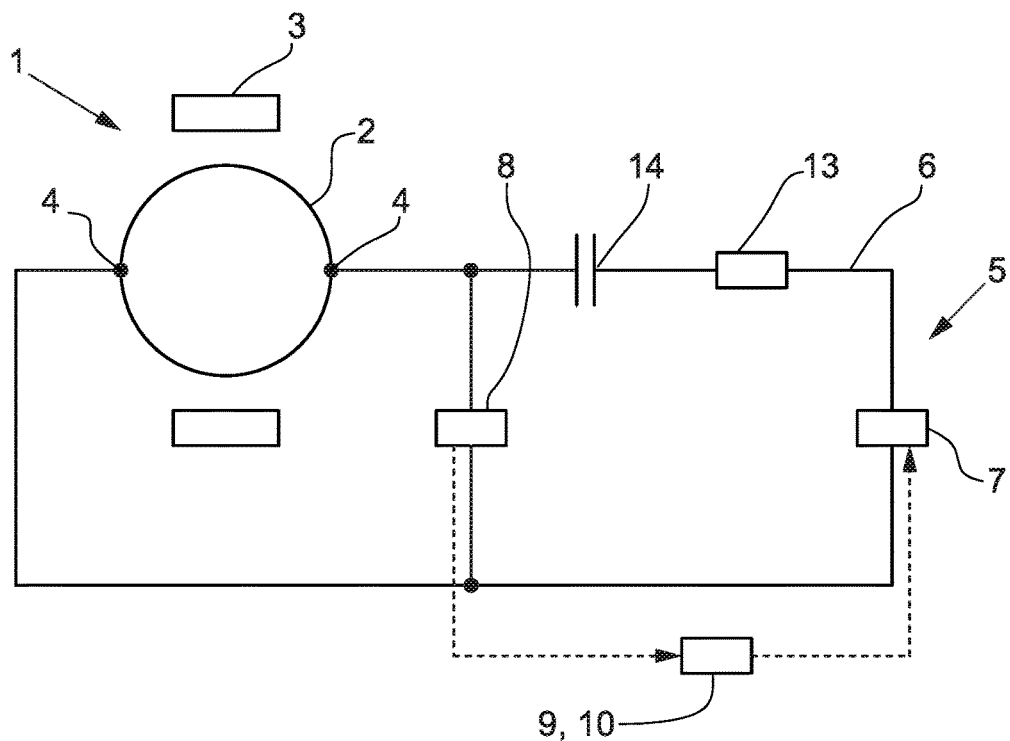
FIG. 1 diagrammatically depicts a first embodiment of a magnetic-inductive flowmeter with conductivity measuring device in accordance with the invention, FIG. 2 diagrammatically depicts a second embodiment of a magnetic-inductive flowmeter with a conductivity measuring device in accordance with the invention.

FIG. 1 shows a magnetic-inductive flowmeter 1. The magnetic-inductive flowmeter 1 has a measuring tube 2 for guiding an electrically conductive medium and a magnetic field generator 3. Two electrodes 4 are used for tapping a measuring voltage induced in the medium. In order to be able to determine the conductivity of the conductive medium as well, the magnetic-inductive flowmeter 1 has a conductivity measuring device 5. The conductivity measuring device 5 has a measuring circuit 6, wherein the two electrodes 4 are part of the measuring circuit 6. The measuring circuit 6 also has a voltage source 7 and a measuring unit 8. The voltage source 7 generates a measuring circuit voltage in the measuring circuit 6 and the measuring unit 8 measures the actual electrode voltage applied between the electrodes 4. In addition, the conductivity measuring device 5 has a control unit 9 and an evaluation unit 10 which, in the embodiment shown here, are implemented as a common unit, namely as a microcontroller. In the operating state of the conductivity measuring device 5, the control unit 9 sets the actual electrode voltage to a predetermined constant setpoint value. The evaluation unit 10 determines the electrode current flowing between the electrodes 4 and uses the value for the determined electrode current and the actual electrode voltage to calculate a variable related to the conductivity of the medium, such as the resistance value of the medium and/or the conductivity value of the medium.

The magnetic-inductive flowmeter 1 shown here has the advantage that the actual electrode voltage applied between electrodes 4 is set to a constant value. Since conductivity measurement influences the magnetic-inductive flow measurement by the residual voltages remaining between the electrodes 4, the magnetic-inductive flowmeter 1 shown here can be used to ensure that the remaining residual voltages are constant and do not depend on the conductivity of the medium or are not determined by the conductivity of the medium. The remaining residual voltages lead to an error in the flow measurement and are particularly noticeable by a voltage offset in the measured measuring voltage induced by the magnetic field in the medium. Due to the constant actual electrode voltage between the electrodes 4 and thus due to the constant residual voltages, a constant offset value results, so that the magnetic-inductive flow measurement is no longer dependent on the conductivity of the medium.

Figure 2:
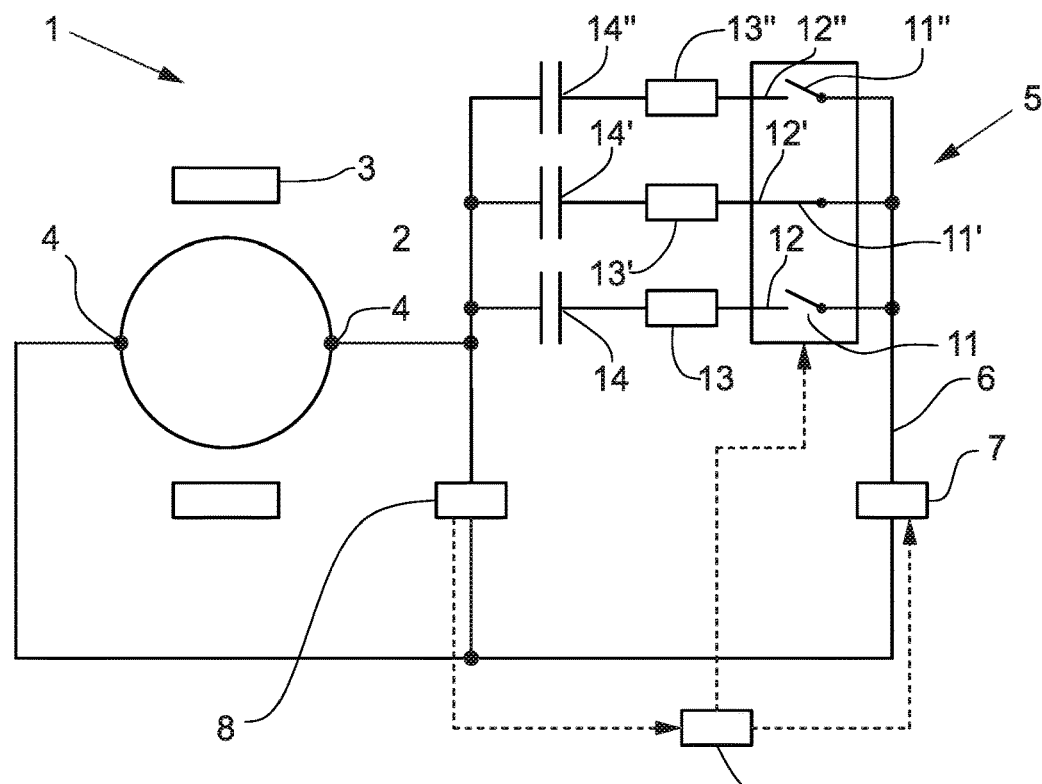

FIG. 2 shows a further embodiment of a magnetic-inductive flowmeter 1 with a conductivity measuring device 5. In contrast to the embodiment shown in FIG. 1, the measuring circuit 6 has three alternative measuring paths 12, 12', 12" which can each be integrated into the measuring circuit 6 by means of a switch 11, 11', 11". In the embodiment shown, the switch 11' is closed, whereas the two switches 11, 11" are open, so that the measuring path 12' is actively integrated in the measuring circuit 6.

Each of the measuring paths 12, 12', 12" has an ohmic resistance 13, 13', 13". The resistors 13, 13', 13" each have a different resistance value. In addition, each measuring path 12, 12', 12" has a capacitor 14, 14', 14". The capacitors 14, 14', 14" are used to filter out DC components in the measuring circuit voltage.

In contrast to the embodiment shown in FIG. 1, the embodiment shown in FIG. 2 has the further advantage that the measuring range of the conductivity measuring device 5 can be varied and adapted to the medium by connecting one of the measuring paths 12, 12', 12" accordingly. The control unit 9 is designed such that it checks whether the voltage source 7 is operated at the limit of its control range and whether the control difference determined by the control unit 9 is above a predetermined value. If the voltage source 7 is operated at the limit of its control range and, in addition, the control difference is above a predetermined value, the control unit 9 switches another measuring path 12, 12', 12" into measuring circuit 6. The voltage source 7 is implemented here by a digital/analog converter. Accordingly, measuring unit 8 is implemented as an analog/digital converter.

Figure 3:
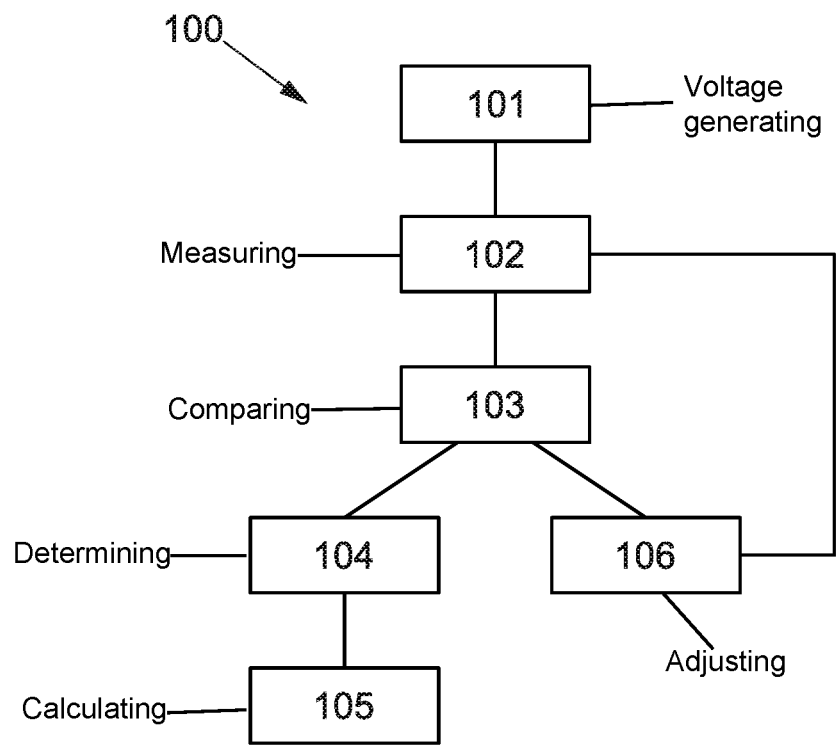
FIG. 3 is a block diagram of a first embodiment of the method in accordance with the invention.

FIG. 3 shows a block diagram of an embodiment of a method 100 for operating a described magnetic-inductive flowmeter 1. In a generating step 101, a measuring circuit voltage is generated by the voltage source 7 in the measuring circuit 6. In a measuring step 102 the actual electrode voltage between the electrodes 4 is measured by the measuring unit 8. In a comparison step 103, the control unit 9 compares the measured actual electrode voltage with a predetermined setpoint value and determines a control difference. In a determination step 104 the evaluation unit 10 determines the electrode current flowing between the electrodes 4 and in a calculation step 105 the evaluation unit calculates a value for the conductivity from the electrode current and the actual electrode voltage and/or a variable related to the conductivity.

If the control difference exceeds a predetermined value, the measuring circuit voltage is adjusted in an adjusting step 106 by the control unit 9 until the control difference is below the predetermined value or corresponds to the predetermined value.

In the method shown, in the determining step 104, the electrode current is determined from the difference between the applied measuring circuit voltage and the actual electrode voltage and a resistance value of the measuring circuit 6.

Figure 4:
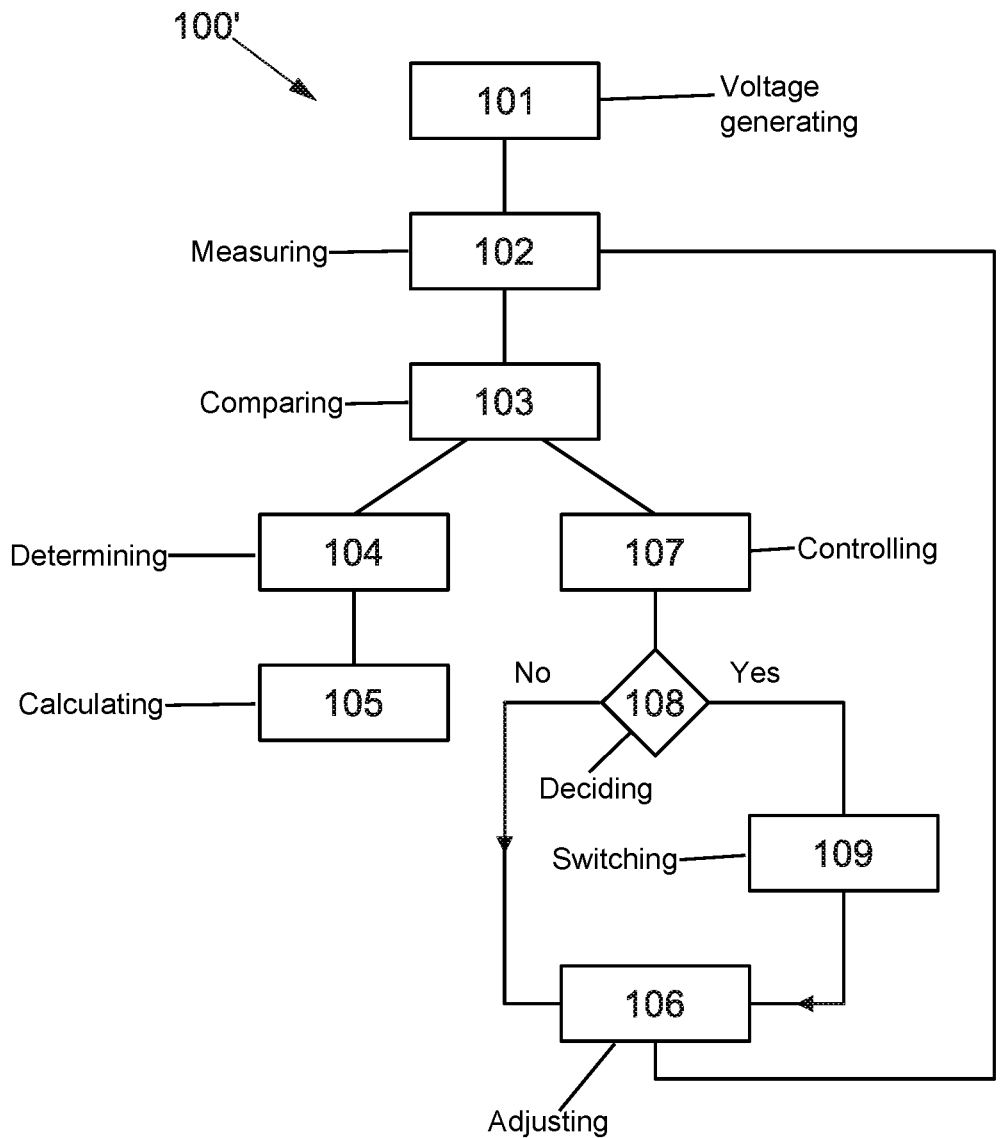
FIG. 4 is a block diagram of a second embodiment of the method in accordance with the invention.

FIG. 4 shows a block diagram of a second method 100' for operating a magnetic-inductive flowmeter 1. The method 100' is carried out in a magnetic-inductive flowmeter 1 with a conductivity measuring device 5, in which the measuring circuit 6 has at least two alternative measuring paths 12, 12', 12" which can be integrated into the measuring circuit 6 by means of a switch 11, 11', 11" in each case, wherein each of the at least two measuring paths 12, 12', 12" has a resistor 13, 13', 13". The resistors 13, 13', 13" have a different resistance value from one another. The corresponding resistance values are stored in the control unit 9. The method 100' shown in FIG. 4 differs from the method 100 shown in FIG. 3 in that further method steps are carried out. After the comparison step 103, the control unit 9 carries out the control step 107. In the control step 107, the control unit 9 checks whether the voltage source 7 is operated at the limit of its control range and whether the control difference is above a predetermined value, i.e. whether the actual electrode voltage deviates from the setpoint value by more than a tolerable value. In a subsequent decision step 108, the control unit 9 decides whether another and which measuring path 12, 12', 12" is to be switched into the measuring circuit 6. If the voltage source 7 is operated at the limit of its control range and if, in addition, the control difference is greater than the predetermined value, the control unit 9 decides to perform a switching step 109 and to switch another measuring path 12, 12', 12" into the measuring circuit 6. If the control unit 9 decides, in the decision step 108, that switching is not to be carried out, the adjusting step 106 is carried out without switching another measuring path 12, 12', 12" into the measuring circuit 6.

What is claimed is:

1. Magnetic-inductive flowmeter, comprising:
   a measuring tube for guiding a conductive medium,
   a magnetic field generator for generating a magnetic field permeating the measuring tube at least partially perpendicular to the flow direction of the medium,
   electrodes for tapping a measuring voltage induced in the medium, and
   a conductivity measuring device for determining the conductivity of the conductive medium,
   wherein the conductivity measuring device has a measuring circuit,
   wherein the electrodes are a part of the measuring circuit,
   wherein the measuring circuit has a voltage source and a measuring unit,
   wherein the voltage source generates a measuring circuit voltage in the measuring circuit in an operating state of the conductivity measuring device,
   wherein the measuring unit measures an actual electrode voltage present between the electrodes,
   wherein the conductivity measuring device has a control unit for setting the actual electrode voltage to a predetermined, constant setpoint value in the operating state of the conductivity measuring device, and an evaluation unit for determining the electrode current flowing between the electrodes and calculating a conductivity value of the medium or a variable associated with the conductivity using an electrode current value determined by the evaluation unit and the actual electrode voltage set by the control unit, and
   wherein the predetermined constant setpoint value is stored in the control unit and the control unit is adapted for determining a control difference from a comparison of the actual electrode voltage measured by the measuring unit to the setpoint value stored in the control unit and for adjusting the measuring circuit voltage until the control difference lies at or below the predetermined value if the control difference exceeds a predetermined value, and wherein the control unit is one of P-controller, PI-controller or PID-controller.

2. Magnetic-inductive flowmeter according to claim 1, wherein the measuring circuit comprises a current measuring unit for measuring the electrode current and for transmitting the value for the electrode current to the evaluation unit.

3. Magnetic-inductive flowmeter according to claim 1, wherein the evaluation unit is adapted for determining a voltage difference between the measuring circuit voltage generated and the actual electrode voltage and for calculating the electrode current using the voltage difference and a resistance value of the measuring circuit.

4. Magnetic-inductive flowmeter according to claim 1, wherein the measuring circuit has at least two alternative measuring paths which are able to be separately integrated into the measuring circuit by a switch, wherein each of the at least two measuring paths has a resistor, and wherein the resistors of the at least two measuring paths have resistance values which differ from one another, wherein the resistance values of the resistors are stored in the control unit, and wherein the control unit is adapted for switching the switch for effectively connecting a respective one of the alternative measuring paths into the measuring circuit.

5. Magnetic-inductive flowmeter according to claim 4, wherein the control unit is adapted for determining which measuring path is to be effectively connected in the measuring circuit depending on whether the control difference is above a predetermined value and whether the voltage source is being operated at a limit of its controlling range.

6. Magnetic-inductive flowmeter according to claim 4, wherein each measuring path has a capacitor connected in series with the resistor for filtering of direct voltage portions in the measuring circuit voltage.

7. Method for operating a magnetic-inductive flowmeter comprising a measuring tube for guiding a conductive medium, a magnetic field generator for generating a magnetic field permeating the measuring tube at least partially perpendicular to the flow direction of the medium, electrodes for tapping a measuring voltage induced in the medium, and a conductivity measuring device with a measuring circuit, wherein the electrodes are a part of the measuring circuit, wherein the measuring circuit has a voltage source and a measuring unit, and wherein the conductivity measuring device has a control unit and an evaluation unit, the method comprising:

using the voltage source for generating a measuring circuit voltage in the measuring circuit in a generating step, using the measuring unit for measuring the actual electrode voltage between the electrodes in a measuring step, using the control unit for comparing the measuring actual electrode voltage to a predetermined setpoint value to determine a control difference in a comparing step, wherein, in a case in which the control difference determined in the comparing step exceeds a predetermined value, using the control unit for adjusting the measuring circuit voltage until the control difference lies at or below the predetermined value in an adjusting step, wherein the evaluation unit is used to determine the electrode current flowing between the electrodes in a determining step, and wherein the evaluation unit is used for calculating at least one of a value of the conductivity or a variable associated with the conductivity from the actual electrode voltage and the electrode current in a calculating step.

8. Method according to claim 7, wherein the electrode current is determined from a difference of the applied measuring circuit voltage and the actual measuring circuit voltage and a resistance value of the measuring circuit in the determining step.

9. Method according to claim 7, wherein the determining step and the calculating step are carried out when the control difference corresponds to a predetermined value or lies below the predetermined value.

10. Method according to claim 7, wherein the determining step and the calculating step are carried out independent of the value of the determined control difference.

11. Method according to claim 7, wherein the measuring circuit has at least two alternative measuring paths that can each be integrated in the measuring circuit through a switch, wherein each of the at least two measuring paths has a resistor and wherein the resistors of the at least two measuring paths have different resistance values, and wherein the at least two resistance values of the resistors are stored in the control unit, further comprising a connecting step in which one of the measuring paths is effectively connected in the measuring circuit by the control unit.

12. Method according to claim 11, further comprising a control step in which the control unit checks whether the voltage source is being operated at the limit of its controlling range and whether the control difference is above the predetermined value and a deciding step in which the control unit decides which measuring path is effectively connected in the measuring circuit and whether another measuring path would be more effectively connected in the measuring circuit.

* * * * *